Patented Nov. 25, 1952

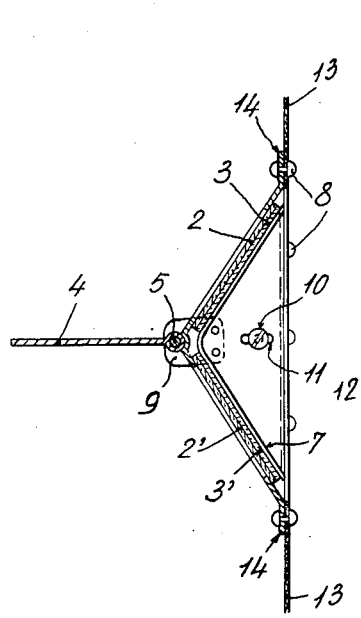
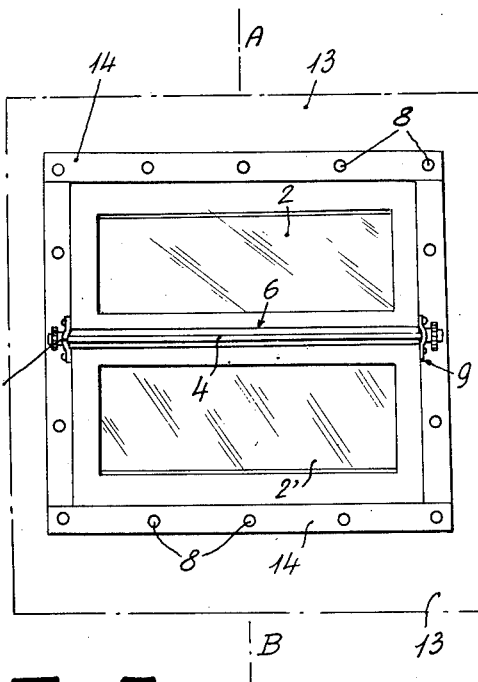
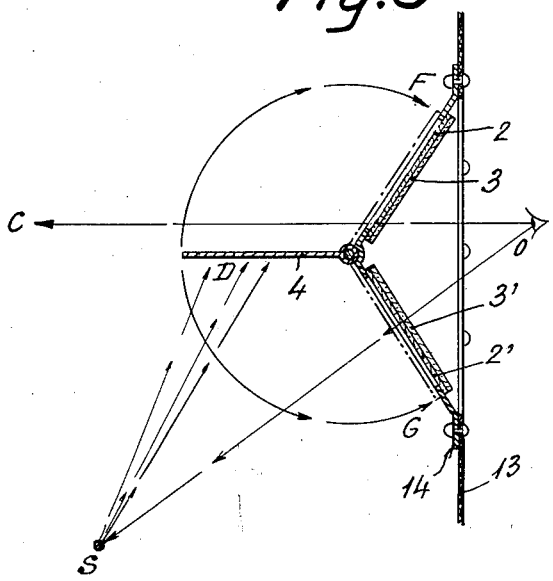

2,618,781

UNITED STATES PATENT OFFICE 2,618,781

WELDER'S PROTECTION MEANS

André R. Beauverger, Beziers, France

Application February 21, 1950, Serial No. 145,563
In France March 3, 1949

3 Claims. (Cl. 2—8)

This invention relates to protection means for use in arc welding and the like, and more particularly to an improved form of welder's mask and/or helmet.

It is an object of this invention to provide a novel welding mask having improved visibility while affording satisfactory protection for the welder's eyes.

Another object is to enable a welder to prepare and position his work with full visibility at the start of a welding operation, and then to proceed with the welding without having to shift his sight-protecting means in the meanwhile, as from a non-protecting to a protecting position.

A further object is to provide a welder's mask that does not require to be jerked into protective condition after the workpieces have been prepared and positioned and before the actual welding process is commenced, but that may be retained in its initial condition until after the welding has been started, while affording full protection for the welder's eye-sight.

A further object is to provide such a mask or sight-protection means additionally including a manually-shiftable screening plate that may be shifted to a desired screening position after actual welding has been started and the welder has the free use of one hand.

The above and further objects will be made clear as the description proceeds.

It is the practice in welding to use a rockable protecting helmet or mask provided with a cutout or window in which an opaque or translucent plate of glass or other suitable sheet material is inserted. When using such a mask, the welder on putting on the mask before starting a welding operation places the mask in its non-protective condition, with the rockable window-rocked upwardly, so as to leave in front of his eyes an open space through which he can see to prepare and position his work. At the first burst of the welding arc, and while still, usually, requiring both his hands to hold the parts to be welded in position, the welder then jerks the rockable window of the mask down into its protective position with a quick movement of his head, so as not to have to let go the work, and in order to interpose the opaque screen of the mask into protective position between the arc and his eyes. This jerking movement quite often reacts on the hand of the welder holding the electrode-carrier, so that the electrode does not strike the workpiece exactly at the desired point, or otherwise disturbs his work. Sometimes also, the welding arc fails to set up at the welder's first attempt, and the welder then has to let go of his work, lift the mask to its open position, and re-position the work before he proceeds as above. All this is a source of defective welding and loss of time.

To eliminate the above shortcomings of known welding masks and/or helmets as briefly outlined above, I provide a welder's sight-protecting means which essentially comprises a translucent protective portion normally directed towards the work when in welding position and a further and transparent protective portion normally directed at an angle from the direction of the work when in welding position. When welding in the usual underhand position the translucent protective means is beneath and the transparent protective means above, and this relationship is reversed when required to weld in overhead position. With such an arrangement the welder, when requiring direct visibility, as for preparing or positioning his work before commencing the weld, has only to lower his head to be able to see the work through the upper transparent protective means, then, having positioned the parts and before starting the welding arc, lift his head to a normal attitude, whereupon he will be able to follow the weld as in conventional masks through the lower translucent means.

No jerking or similar movement is required to position the mask after welding has started that might be liable to disturb the operation.

Further according to my invention, I provide a pivoted screen projecting forwardly from between the upper and lower protective means or windows, and means to manually set the screen in a desired position when additional protection may be required as against reverberation from the arc. Because of the above-described construction of the improved mask, this additional screen need only be manipulated after the actual welding operation has been started, so that the work is already held in place and one of the welder's hands is then available for setting the screen.

My invention will now be described with greater detail in a preferred embodiment thereof, given by way of indication and not of limitation, and with reference to the accompanying drawings in which:

Fig. 1 is a vertical cross-section of the device on line A—B of Fig. 2.

Fig. 2 is an elevational view thereof from the front.

Fig. 3 is an explanatory diagram illustrating the use of my improved sight-protecting means.

As shown, I may provide a frame 14 made of any suitable metal or protective material, secured as with rivets 8 in a cut-out formed in the front of a protecting hood or helmet 13 of suitable type. As shown in Fig. 1, the frame 14 has secured to it or is formed with a forwardly-protruding V-shaped supporting structure 7 of sheet metal having triangular side-walls and formed with rectangular apertures or windows in its upwardly and downwardly directed faces with suitable means for securing protective plates of glass or the like in each aperture. As shown, the upper window has mounted in it two spaced elements 2 and 3 of transparent sheet glass or other transparent sheet material, and the lower window has mounted in it two spaced elements 2' and 3' of translucent sheet glass or other translucent sheet material. In the triangular side wall of the mounting structure 7 I have shown an elongated hole 11 through which a clamping screw 10 extends to clamp the glass sheets in place.

A sheet metal screen 4 is pivoted on an axis extending along the protruding edge between the upper and lower windows, the screen member 4 being, as shown, secured (as by welding or crimping) or formed integral with a tubular part 6 pivoted on a pivot rod 5 between a pair of side brackets or flanges 9 at the sides of the mounting. The pivot 5 is provided with an actuating knob at either of or both its ends, to enable shifting the screen 4 through the arc F—D—G (see Fig. 3). Means are provided to releasably block the screen 4 in the intermediate horizontally-projecting position D as shown in Figs. 1 and 3. For example, the flanges 9 may be provided as resilient spring-plates and a rib or catch 12 formed in one or both flanges 9 thus to hold the screen releasably in the jutting position D.

In use, as shown in Fig. 3, the welder can see with perfect visibility in the direction OC. To prepare and position his work, he needs only to lower his head sufficiently to bring the upper transparent window into the line OS. Then he resumes his normal substantially upright attitude and starts off the welding arc, being able to follow the progress of the weld through the translucent window 2'3' without hurting his eyes. Once the welding is started off and he has the free use of one hand, he can if he so wishes actuate the knob provided therefor to raise the screen 4 from the intermediate position D to its upper position F to afford further protection against reverberation.

It will be understood that the details of embodiment illustrated and described have been indicated for explanatory purposes only, and that the invention is restricted only by the wording of the claims.

What I claim is:

1. In a welder's protection means, an opaque apertured mask, a mounting structure secured to said mask in the aperture thereof in the form of a forwardly-jutting V, an upwardly-directed window opening in one, and a downwardly-directed window opening in the other arm of said V, means for mounting a translucent sheet member in one of said window openings and means for mounting a transparent sheet member in the other window opening, a manually settable screen pivoted on a horizontal axis along the line of intersection of said V and means for manually setting said screen to a desired one of at least two positions including a forwardly-projecting intermediate position and a position overlying said transparent sheet member.

2. In a welder's opaque protection mask two window openings, a translucent solid sheet member mounted in one of said window openings, a transparent solid sheet member mounted in the other window opening, said two sheet members being placed in said mask to form an acute angle of which the vertex is outwardly directed from said mask, a rotatable screen pivoted on said mask outside of said vertex and means for setting said screen into at least two positions including a forwardly projecting intermediate position between the two sheet members and a position overlying said transparent sheet member.

3. In a welder's opaque protection mask an aperture, a forwardly-jutting V-shaped frame mounted in front of said aperture, window openings in the two sides of said V-shaped frame, a translucent solid sheet member mounted in one of said window openings, a transparent solid sheet member mounted in the other of said window openings, said translucent and said transparent sheet members having essentially the same size, a rotatable screen, a horizontal shaft to support said screen pivoted along the line of intersection of said V-shaped frame and means for manually setting said screen into at least two positions including a forwardly projecting intermediate position between the two sheet members and a position overlying said transparent sheet member.

ANDRÉ R. BEAUVERGER.

REFERENCES CITED

The following references are of record in the file of this patent:

UNITED STATES PATENTS

| Number | Name | Date |
|---|---|---|
| 1,861,797 | Holt | June 7, 1932 |
| 2,395,053 | Landis | Feb. 19, 1946 |

FOREIGN PATENTS

| Number | Country | Date |
|---|---|---|
| 396,723 | France | Feb. 3, 1909 |
| 860,096 | France | Sept. 20, 1940 |